Sept. 25, 1923.
C. C. BRADBURY
COUPLING
Filed June 17, 1921
1,468,732
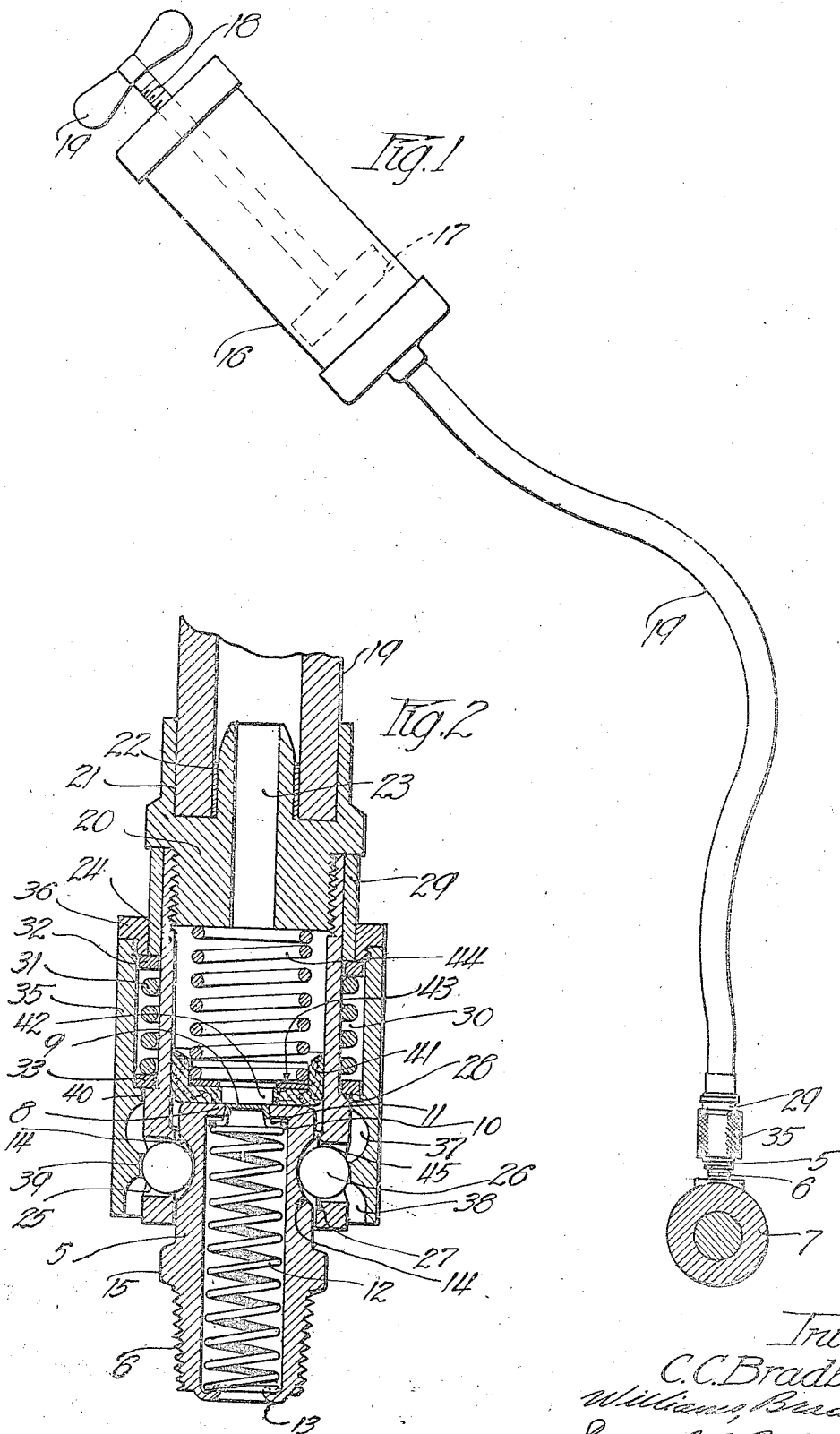
Inventor
C. C. Bradbury Patented Sept. 25, 1923.

1,468,732

UNITED STATES PATENT OFFICE.

CLIFFORD C. BRADBURY, OF OAK PARK, ILLINOIS, ASSIGNOR TO BASSICK MANUFACTURING COMPANY, OF CHICAGO, ILLINOIS, A CORPORATION OF DELAWARE.

COUPLING.

Application filed June 17, 1921. Serial No. 478,222.

*To all whom it may concern:*

Be it known that I, CLIFFORD C. BRADBURY, a citizen of the United States, and resident of Oak Park, in the county of Cook and State of Illinois, have invented a certain new and useful Improvement in Couplings, of which the following is a full, clear, concise, and exact description, reference being had to the accompanying drawings, forming a part of this specification.

My invention relates to improvements in couplings and is particularly concerned with improvements in couplings forming a part of a lubricating system comprising a plurality of coupling members or fittings which are permanently secured to the bearings to be lubricated, and a lubricant compressor having a discharge conduit the free end of which is provided with a coupling member for making successive detachable connections with the coupling member or fittings secured to the bearings to be lubricated.

The objects of my invention are:

First, to provide a coupling in which the coupling member secured to the discharge conduit of the compressor comprises a locking member which can be either attached to or detached from the coupling members or fittings secured to the bearings, by a movement in either of two different directions.

Second, to provide a coupling member to be secured to the free end of the discharge conduit of a lubricant compressor comprising a portion which can be moved longitudinally with respect to the coupling in either direction, either for attaching or for detaching the coupling member from the coupling members secured to the bearings, and Third, to provide a coupling member of the character described which is simple in construction, rugged and easy to operate.

Other objects will appear as this description progresses, reference being had to the accompanying drawings, in which—

Figure 1 is a plan view showing my improved coupling in elevation in use for connecting the discharge conduit of the lubricant compressor with a bearing, and Figure 2 is a central longitudinal section through my improved coupling.

Throughout both views similar reference characters will be used for referring to similar parts.

The coupling members or fittings which form a part of my improved coupling and which are secured to the bearings to be lubricated, each comprises a tubular member 5, one end of which is exteriorly threaded as shown at 6 to provide means for securing it to a bearing 7 to be lubricated, and the other end of which is provided with an inwardly extending flange 8 which forms a seat for the sheet metal closure 9, which is in the form of a cap having a flange 10 extending from the inner edge thereof, which is provided with suitable apertures 11, through which the lubricant can pass when the cap is moved inwardly under the pressure of the lubricant against the tension of the compression spring 12. The inner end of the spring 12 abuts against the inturned flange 13. An annular groove 14 is formed in the periphery of the tubular member 5 adjacent the end closed by the closure 9. If desired, facets 15 may be formed on the tubular member to provide means whereby the tubular member can be inserted by means of a wrench.

In Figure 1 I have illustrated a compressor of conventional form which comprises a barrel 16 in which is slidably mounted a suitable piston 17, which can be reciprocated by means of the screw threaded rod 18, the outer end of which is provided with a handle 19 by menas of which it can be rotated. The barrel 16 is provided with the flexible discharge conduit 19 preferably formed of flexible metallic hose, and to the end of which is secured my improved coupling member which is formed as follows:—

The plug 20 is provided at its inner end with an annular groove 21 for receiving the free end of the flexible conduit 19, which is secured therein by solder 22 or any other suitable means. The plug 20 is provided with a bore 23 which forms a continuation of the bore of the flexible conduit 19. The inner end of the sleeve 24 is threaded upon the outer end of the plug 20 and is provided adjacent its outer end with a plurality of openings 25 for receiving the balls 26, the inner ends of the openings being constricted as shown at 27 to provide an annular abutment which prevents the balls 26 from passing entirely through the openings 25.

The sleeve 24 is reduced in diameter from a point adjacent the openings 25 to provide a shoulder 28. A collar 29 surrounds the inner end of the sleeve 24 and it, together with the shoulder 28, forms an annular groove 30 for receiving the spiral compression spring 31, the ends of which bear against the split rings 32 and 33 located at opposite ends of the groove 30 and slidable upon the sleeve 24. The outer edges of the collars 32 and 33 project beyond the adjacent surfaces of the collar 29 and the sleeve 24.

A second sleeve 35 has its inner end threaded to the collar 36 which is, in turn slidably mounted upon the collar 29. Its outer end extends to a point substantially flush with the outer end of the sleeve 24. A pair of spaced, annular grooves 37 and 38 are formed in the inner side of the ring 35 adjacent its outer end and form an annular rib 39 which is normally held in registry with the openings 25 by the engagement of the ring 32 with the collar 36 and the ring 33 with the annular rib 40 projecting from the inner side of the sleeve 35.

Means may be provided for sealing the connection between the coupling member 5 and the coupling member secured to the discharge conduit 19, and in the accompanying drawings I have illustrated these means as comprising a cup leather 41 having an opening 42 formed therein in registry with the opening in the closed end of the tubular member 5. A washer 43 is seated on the bottom of the cup 41 and provides an abutment for one end of the compression spring 44, the other end of which rests against the outer end of the plug 20. A shoulder 45 formed on the inner wall of the sleeve 24 provides means for preventing the cup leather 41 from being entirely displaced from the sleeve 24. From the above description it will be seen that the sleeve 35 can be moved in either direction longitudinally of the sleeve 24 against the tension of the spring 31, and that if moved in one direction the groove 37 will be brought into registry with the openings 25, whereas if moved in the opposite direction the groove 38 will be brought into registry with the openings 25. In either position the balls 26 can drop into the corresponding groove, so as to permit the coupling member secured to the discharge conduit 19 to be either slipped over or removed from the coupling member 5. Upon releasing the sleeve 35, the latter will be moved under the tension of the spring 31, in either direction, to its normal position, shown in Figure 2, in which it forces the balls 26 into the groove 14 of the coupling member 5, and thus locks the two coupling members together.

To bring the two coupling members into the proper position to be locked together it is necessary to move the cup leather 41 inwardly against the tension of the spring 24 and the tension of this spring causes an initial seal to be formed between the cup leather 41 and the adjacent end of the coupling member 5, which seal increases with increase in pressure on the lubricant being conducted by the coupling member.

While I have described the details of construction of the preferred embodiment of my invention, it is to be clearly understood that my invention is not limited to these details, but is capable of other adaptations and modifications within the scope of the appended claims.

Having thus described my invention, what I claim is:—

1. A coupling comprising a tubular coupling member having an annular groove adjacent one end, a hollow coupling member for receiving the grooved end of said tubular coupling member, the wall of said hollow coupling member having an opening therethrough for registering with said annular groove, a ball loosely held in said opening and adapted to project into said groove, a sleeve slidably mounted on said hollow coupling member, the said sleeve having a pair of spaced grooves in its inner surface forming an annular rib, the said hollow coupling member having a shoulder adjacent its outer end and a collar slidable thereon in spaced relation to said shoulder to form an annular groove, a ring at each end of said last named groove, a compression spring in said groove for holding said rings in spaced relation, spaced abutments projecting inwardly from said sleeve for engaging said rings to hold said sleeve with its annular rib in registry with the opening in said hollow coupling member and thereby holding said ball in the groove in said tubular coupling member, the said sleeve being slidable on said hollow coupling member sufficient distance in either direction to bring either of the grooves therein in registry with said opening to permit said ball to move outwardly into said groove to release said coupling members from each other.

2. A coupling comprising a tubular coupling member having an annular groove adjacent one end, a hollow coupling member for receiving the grooved end of said tubular coupling member, the wall of said hollow coupling member having an opening therethrough for registering with said annular groove, a ball loosely held in said opening and adapted to project into said groove, a sleeve slidably mounted on said hollow coupling member, the said sleeve having a pair of spaced grooves in its inner surface forming an annular rib, spring means on said hollow coupling member for holding said sleeve with its annular rib in registry with said opening, said sleeve being movable in either direction against the tension of said spring to bring either of the grooves in said sleeve in registry with said opening.

3. A coupling comprising a tubular coupling member having an annular groove adjacent one end, a hollow coupling member for receiving the grooved end of said tubular coupling member, the wall of said hollow coupling member having an opening therethrough for registering with said annular groove, a ball loosely held in said opening and adapted to project into said groove, a sleeve slidably mounted on said hollow coupling member, the said sleeve having a pair of spaced grooves in its inner surface forming an annular rib, means for holding said sleeve with its annular rib in registry with said opening, said sleeve being movable in either direction to bring either of the grooves in said sleeve in registry with said opening.

4. A coupling comprising a tubular coupling member having an annular groove adjacent one end, a hollow coupling member for receiving the grooved end of said tubular coupling member, a locking member carried by said tubular coupling member for co-acting with the walls of said groove to lock said coupling members together, a sleeve slidably mounted on said tubular coupling member and movable longitudinally thereof to either of two different positions for releasing said coupling members from each other, the said sleeve comprising means acting at an intermediate position of said sleeve for holding said locking means in the groove of said tubular coupling member.

5. A coupling comprising a tubular coupling member having an annular groove adjacent one end, a hollow coupling member for receiving the grooved end of said tubular coupling member, a locking member carried by said tubular coupling member and co-acting with the walls of said groove to lock said coupling members together, a sleeve slidably mounted on said tubular coupling member and movable thereon to either of two different positions for releasing said coupling members from each other, the said sleeve comprising means acting in a third position of said sleeve for holding said locking means in the groove of said tubular coupling member.

6. A coupling comprising a tubular coupling member having an annular groove adjacent one end, a hollow coupling member for receiving the grooved end of said tubular coupling member, a locking member carried by said tubular coupling member and co-acting with the walls of said groove to lock said coupling members together, a sleeve slidably mounted on said tubular coupling member and comprising means for causing said locking member to assume either locking or releasing position when said sleeve is moved in a direction away from said tubular coupling member.

7. A coupling member comprising an inner sleeve, a flexible gasket slidably mounted in said inner sleeve and subjected to the pressure of the fluid in said coupling member, a spring for urging said flexible gasket toward the outer end of said inner sleeve, locking means mounted on said inner sleeve, an outer sleeve slidably mounted on said inner sleeve, said outer sleeve comprising two members threaded together, one of said members having an inwardly extending flange, a stop member mounted on said inner sleeve for engaging said flange, and a spring confined between said inner and outer sleeves and reacting against said stop member and said outer sleeve, for urging said outer sleeve toward the outer end of said inner sleeve.

8. A coupling member comprising an inner sleeve, a flexible gasket slidably mounted in said inner sleeve and subjected to the pressure of the fluid in said coupling member, a spring for urging said flexible gasket toward the outer end of said inner sleeve, locking means mounted on said inner sleeve, an outer sleeve slidably mounted on said inner sleeve, said outer sleeve comprising two members threaded together, one of said members having an inwardly extending flange, a stop member mounted on said inner sleeve for engaging said flange, and a spring mounted on said inner sleeve and reacting against said stop member and said outer sleeve, for urging said outer sleeve toward the outer end of said inner sleeve.

9. A coupling member comprising an inner sleeve, locking means mounted on said inner sleeve, an outer sleeve mounted on said inner sleeve, said outer sleeve comprising two members threaded together, one of said members having an inwardly extending flange, a stop member mounted on said inner sleeve for engaging said flange, and a spring mounted on said inner sleeve and reacting against said stop member and said outer sleeve, for urging said outer sleeve toward the outer end of said inner sleeve.

In witness whereof, I hereunto subscribe my name this 9th day of June, 1921.

CLIFFORD C. BRADBURY.

Witnesses:
 EDNA V. GUSTAFSON,
 EMILE J. BOURGEOIS.